United States Patent
Biswas et al.

(10) Patent No.: US 8,886,886 B2
(45) Date of Patent: Nov. 11, 2014

(54) SYSTEM CACHE WITH STICKY REMOVAL ENGINE

(71) Applicant: Apple Inc., Cupertino, CA (US)

(72) Inventors: Sukalpa Biswas, Fremont, CA (US); Shinye Shiu, Los Altos, CA (US); James Wang, Vista, CA (US); Robert Hu, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 192 days.

(21) Appl. No.: 13/629,865

(22) Filed: Sep. 28, 2012

(65) Prior Publication Data
US 2014/0095800 A1    Apr. 3, 2014

(51) Int. Cl.
*G06F 12/08*    (2006.01)
*G06F 12/12*    (2006.01)

(52) U.S. Cl.
CPC .................. *G06F 12/126* (2013.01); *G06F 2212/69* (2013.01)
USPC .................. 711/134; 711/E12.022

(58) Field of Classification Search
None
See application file for complete search history.

(56) References Cited

U.S. PATENT DOCUMENTS

| | | |
|---|---|---|
| 5,142,676 A | 8/1992 | Fried et al. |
| 7,356,651 B2 | 4/2008 | Liu et al. |
| 7,640,399 B1 | 12/2009 | Lepak et al. |
| 2007/0005906 A1 | 1/2007 | Miyamoto |
| 2009/0132768 A1 | 5/2009 | Jones et al. |
| 2009/0193195 A1 | 7/2009 | Cochran et al. |
| 2010/0180083 A1 | 7/2010 | Lee et al. |

OTHER PUBLICATIONS

International Search Report and Written Opinion in International Application No. PCT/US2013/061919, mailed Jul. 7, 2014, 10 pages.

*Primary Examiner* — Kevin Verbrugge
(74) *Attorney, Agent, or Firm* — Rory D. Rankin; Meyertons, Hood, Kivlin, Kowert & Goetzel, P.C.

(57) ABSTRACT

Methods and apparatuses for releasing the sticky state of cache lines for one or more group IDs. A sticky removal engine walks through the tag memory of a system cache looking for matches with a first group ID which is clearing its cache lines from the system cache. The engine clears the sticky state of each cache line belonging to the first group ID. If the engine receives a release request for a second group ID, the engine records the current index to log its progress through the tag memory. Then, the engine continues its walk through the tag memory looking for matches with either the first or second group ID. The engine wraps around to the start of the tag memory and continues its walk until reaching the recorded index for the second group ID.

27 Claims, 9 Drawing Sheets

SYSTEM CACHE WITH STICKY REMOVAL ENGINE

BACKGROUND

1. Field of the Invention

The present invention relates generally to data caches, and in particular to methods and mechanisms for optimizing a system cache located in a memory controller.

2. Description of the Related Art

Modern day mobile electronic devices often include multiple components or agents sharing access to one or more memory devices. These multiple agents may make large numbers of requests to memory, and as the number of these requests increases, the power consumption of the device increases, which limits the battery life of the device. One approach for reducing power consumption is to try to reduce the number of times that off-chip memory is accessed by caching data in or near the processor.

Conventional caches are typically coupled to or nearby a processor and store data that is frequently accessed by the processor to reduce latency. In a conventional cache, data may be retained in the cache based on the temporal locality of accesses. For example, when a line is allocated in the cache, the more times the line is referenced, the more difficult it becomes to have this line replaced. However, conventional caches are not designed for storing data that is accessed multiple times when the accesses are widely spaced in time. Such data would tend to get evicted in a traditional cache.

SUMMARY

Systems, memory controllers, caches, and methods for clearing the sticky states of one or more group ID's cache lines within a system cache are disclosed. In a system on chip, multiple agents may be coupled to a memory controller which in turn may be coupled to one or more memory devices. The multiple agents may access the memory device(s) via the memory controller. The memory controller may include a system cache configured to store data for the purposes of reducing the number of requests that access off-chip memory.

The system cache may be shared by multiple agents with different types of access patterns than a typical processor cache would experience. Some cache lines may be referenced multiple times but they may not be referenced in a temporally local fashion. The system cache may not know which lines will be reused, and so a requesting agent may determine how lines are allocated in the system cache.

In one embodiment, the system cache may include a data memory and a tag memory. The data memory may store a plurality of cache lines, and the tag memory may store a plurality of tags corresponding to the plurality of cache lines. The system cache may also include a sticky removal engine to remove the sticky states for cache lines assigned to a given group ID when the software releases the sticky state for the given group ID. The sticky removal engine may be configured to walk through the tag indexes of the tag memory searching for any tags corresponding to the given group ID.

In one embodiment, the system cache may have a multi-way set associative configuration. The sticky removal engine may remove the sticky state for multiple cache lines at a single index without having to process multiple evictions immediately. After the sticky state of a cache line has been cleared, the eviction of the cache line may occur at a later point in time when the cache line is actually reclaimed for a new request that misses in the system cache. In one embodiment, the state of a cache line assigned to the group ID being released may be changed by the sticky removal engine to the LRU dirty state if it's modified already (i.e., dirty state) or to the invalid state if it's not modified (i.e., clean state). In addition, if the agent knows the modified lines (dirty state) won't be referenced again, such as in the case of an intermediate scratch pad, it can discard the lines (invalid instead of LRU dirty state) associated to this group ID. Cache lines with the LRU dirty state may be identified as the best candidates for replacement when a miss occurs.

In various embodiments, the sticky removal engine may be configured to release multiple group IDs as the engine walks through the indexes of the tag memory. The sticky removal engine may receive a first request to release the cache lines allocated for a first group ID, and in response, the engine may start walking through the tag memory looking for group ID tags assigned to the first group ID. In one embodiment, if the system cache has 16 ways, the engine may check 16 tags per index in each step of walking through the tag memory. Each time the engine finds a group ID tag assigned to the first group ID in any of the ways, the engine may change the state of the corresponding line to the LRU dirty state or invalid.

While traversing the tag memory looking for first group ID matches, the sticky removal engine may receive a second request to release all cache lines allocated for a second group ID. The sticky removal engine may log the current index as the starting address for the second group ID's clearance process. Then, the sticky removal engine may continue its walk through the tag memory looking for either the first group ID or the second group ID at each group ID tag at each index. The sticky removal engine may continue its walk until the engine wraps around to the second group ID's starting address. Furthermore, any number of additional release requests may be received for any number of other group IDs. Any number of clearance processes may be allowed to overlap as the sticky removal engine walks through the tag memory, and the engine may take a snapshot of the starting address for each newly received request.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
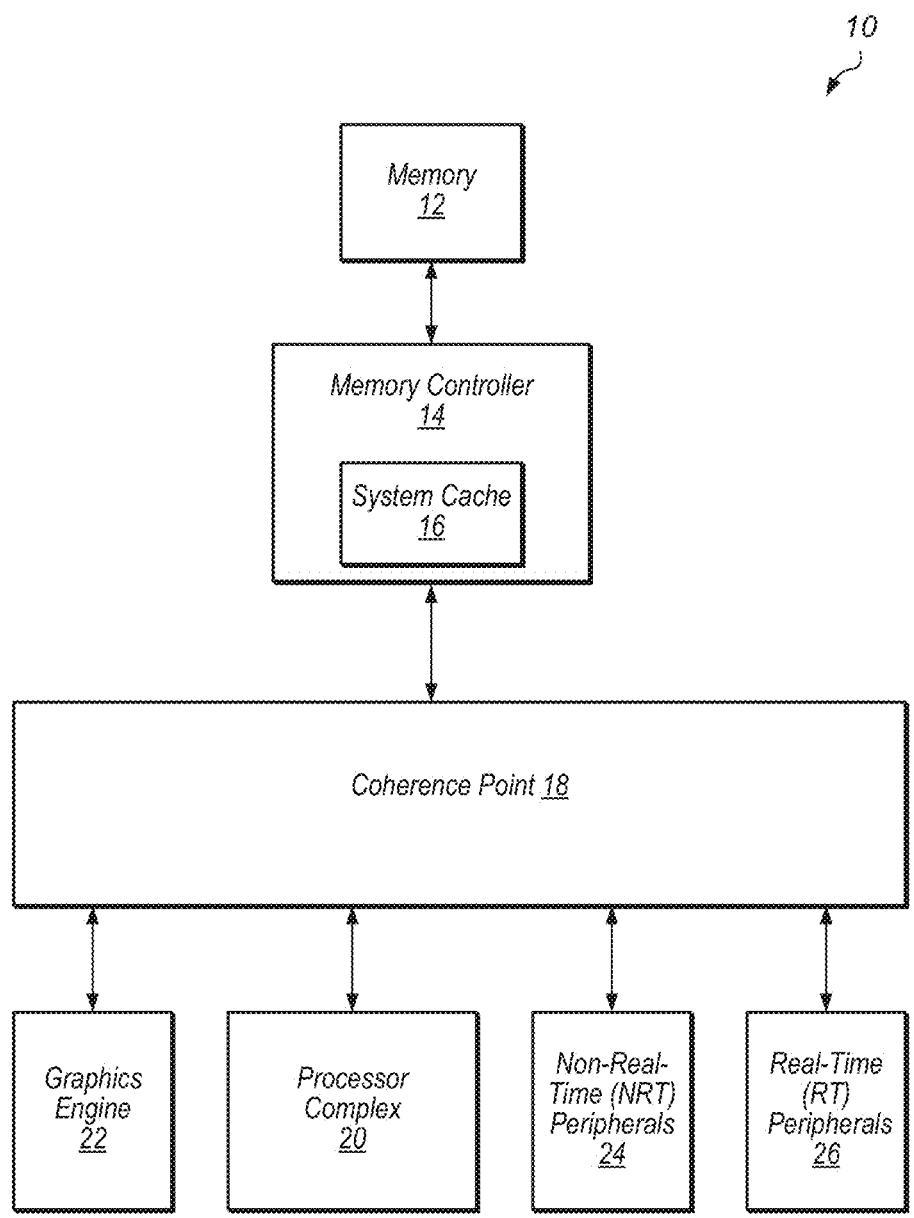
FIG. 1 illustrates one embodiment of a portion of an electronic device.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a cache with a plurality of cache lines, the terms "first" and "second" cache lines can be used to refer to any two of the plurality of cache lines.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a portion of an electronic device is shown. In the illustrated embodiment, electronic device 10 includes a memory 12, memory controller 14, coherence point 18, processor complex 20, graphics engine 22, non real-time (NRT) peripherals 24, and real-time (RT) peripherals 26. It is noted that electronic device 10 may also include other components not shown in FIG. 1. Furthermore, in another embodiment, one or more of the components shown in FIG. 1 may be omitted from electronic device 10. In various embodiments, electronic device 10 may also be referred to as an apparatus, mobile device, or computing device.

Memory 12 is representative of any number and type of memory devices, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc.

Memory controller 14 may include circuitry configured to interface to memory 12, and various components may be coupled to memory controller 14 via coherence point 18. In other embodiments, one or more of the other devices shown in FIG. 1 may be coupled directly to memory controller 14 rather than coupled through coherence point 18. In various embodiments, memory controller 14 may include any number of ports for coupling to various peripherals, components, and/or requesting agents.

Memory controller 14 may include system cache 16 for storing data retrieved from or intended for memory 12. System cache 16 may be configured to process memory requests from multiple requesting agents. One or more requesting agents may be included within any of the devices shown connected to coherence point 18. In one embodiment, cache lines may be allocated in system cache 16 with either a sticky state or a non-sticky state. When deciding which data to retain in system cache 16, system cache 16 may base the decisions on the sticky status of the cache lines. For example, in one scenario, geometry data may be provided to processor complex 20, and this geometry data may be translated to a data structure that a 3D engine inside graphics engine 22 can understand. After the translation is performed, the 3D engine may reference the translated data structure multiple times within a single frame. Therefore, the translated data structure may be allocated in system cache 16 as sticky to ensure that the cache lines storing the data structure are not replaced in system cache 16 by other data. As a result of using the sticky allocation for data that is going to be reused, the number of accesses that are made to memory 12 may be reduced, which reduces latency of memory requests and power consumption of electronic device 10.

Coherence point 18 may be configured to route coherent and non-coherent traffic to and from memory controller 14. Coherence point 18 may also be referred to as a coherence switch. Although not shown in FIG. 1, coherence point 18 may be coupled to other devices, such as a flash controller, camera, display, and other devices.

Processor complex 20 may include any number of central processing units (CPUs) (not shown) and various other components (e.g., caches, bus interface unit). The CPU(s) of processor complex 20 may include circuitry to run an operating system (OS). In various embodiments, the OS may be any type of OS (e.g., iOS). Each of the CPUs may include a level one (L1) cache (not shown), and each L1 cache may be coupled to a level two (L2) cache. Other embodiments may include additional levels of cache (e.g., level three (L3) cache).

Graphics engine 22 may include any type of graphics processing circuitry. Generally, the graphics engine 22 may be configured to render objects to be displayed into a frame buffer (not shown). Graphics engine 22 may include graphics processors that execute graphics software to perform a part or all of the graphics operation, and/or hardware acceleration of certain graphics operations. The amount of hardware acceleration and software implementation may vary from embodiment to embodiment. NRT peripherals 24 may include any non-real time peripherals. Various embodiments of the NRT peripherals 24 may include video encoders and decoders, scaler/rotator circuitry, image compression/decompression circuitry, etc. RT peripherals 26 may include any number and type of real-time peripherals.

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown.

Figure 2:
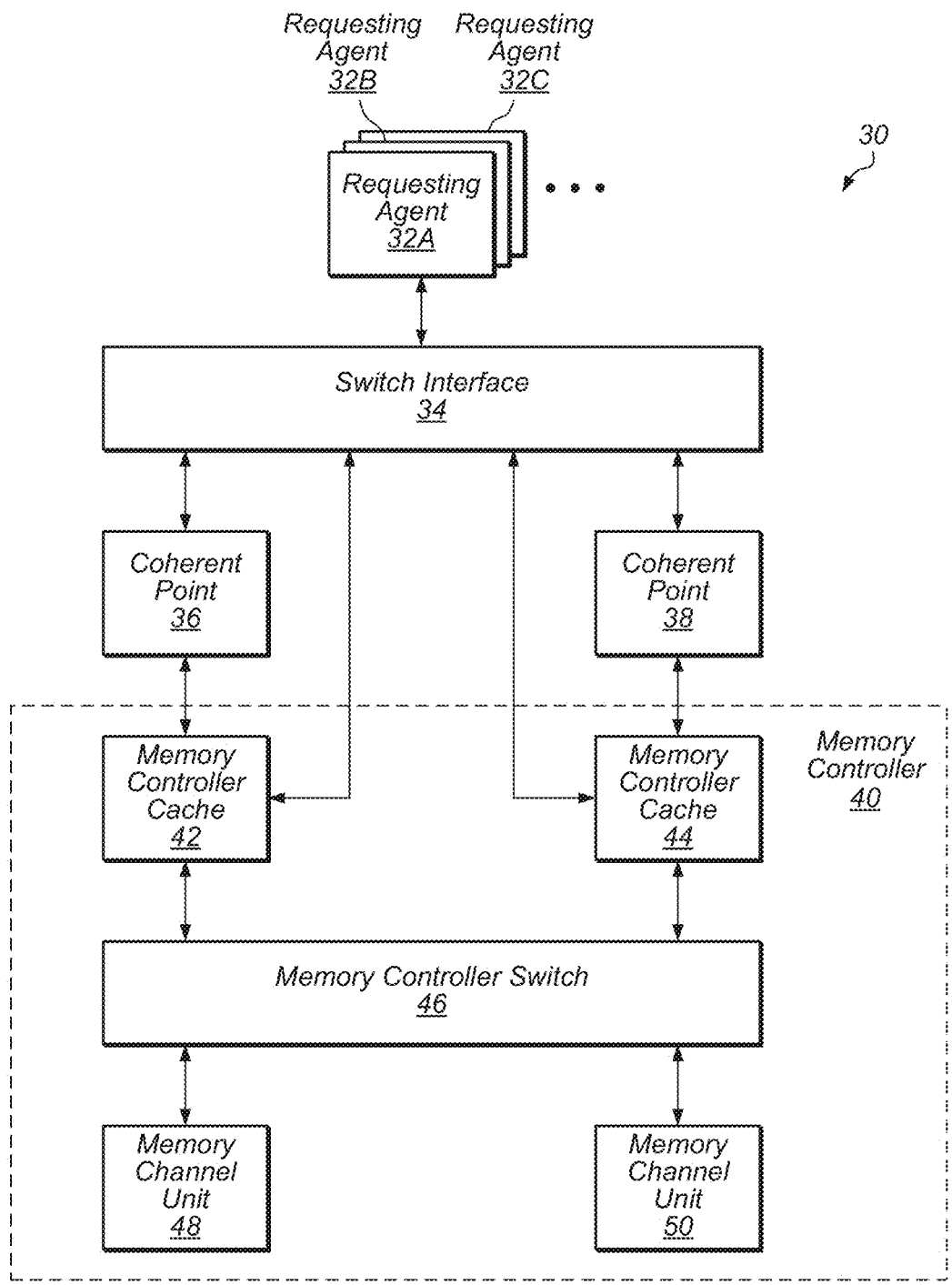
FIG. 2 illustrates one embodiment of a portion of an integrated circuit.

Turning now to FIG. 2, one embodiment of a portion of an integrated circuit is shown. Integrated circuit (IC) 30 may include requesting agents 32A-C, switch interface 34, coherence points 36 and 38, and memory controller 40. Memory controller 40 may include memory controller caches 42 and 44, memory channel switch 46, and memory channel units 48 and 50. Memory controller 40 may be coupled to one or more memory devices (not shown). In various embodiments, IC 30 may be included within any of various types of electronic devices, including mobile, battery-powered devices. IC 30 may also be referred to as a system on chip (SoC). It is noted that IC 30 may include other components and interfaces not shown in FIG. 2.

The requesting agents 32A-C may be configured to perform various operations in the system, and may access memory as part of performing these operations. For example, requesting agents 32 may be processors (either general purpose processors, or special purpose processors such as graphics processors). The processors may be configured to access memory to fetch instructions for execution, and may also be configured to access various data operands of the instructions in memory in response to executing the instructions. Other requesting agents may include fixed function circuitry (e.g., DMA controllers, peripheral interface controllers). The requesting agents 32 may be physically separate circuitry, such as a separate instance of a processor. Alternatively, a requesting agent may be a logical entity such as a process or thread executing on a processor, such that a single physical processor may include multiple logical requestors. The number of requesting agents 32A-C included in a given embodiment may vary, from one to any number of requesting agents.

A given requesting agent (physical or logical) may be identified by a requesting agent identifier (ID). In various embodiments, the requesting agent may add a transaction identifier (TID) to track each individual request separately. Each request generated by a requesting agent 32A-C may be accompanied by a group ID. The group ID may also be referred to as dataset ID. The group ID may be a separate identifier from the requesting agent ID and the TID, and the number of bits used to represent the group ID value may vary depending on the embodiment. For example, in one embodiment, four bits may be used to represent the group ID value, and there may be 16 separate group IDs. The group ID may be assigned to a request based on the dataflow to which the request belongs. The OS or device driver, depending on the embodiment, may assign the group ID. For some types of dataflows, the same group ID may be shared by multiple requesting agent IDs. In one embodiment, requests to page translation tables may be considered part of the same dataflow, and any of these requests, regardless of the requesting agent ID, may be assigned to a common group ID. For other types of dataflows, a group ID may be utilized by only a single requesting agent.

Coherence points 36 and 38 may be configured to manage the coherency of requests that are conveyed to the memory controller 40 from the requesting agents 32A-C. In one embodiment, traffic from requesting agents 32A-C may be split up in switch interface 34 and traverse a specific coherence point depending on the address that is being targeted by the specific memory request. Other embodiments may include other numbers of coherence points.

Memory controller caches 42 and 44 may be separate physical caches but may be considered a single logical memory controller cache. More specifically, memory controller caches 42 and 44 may share a single address space, and memory requests that reference the address space of cache 42 may be routed by switch interface 34 to cache 42 via coherent point 36 and memory requests that reference the address space of cache 44 may be routed by switch interface 34 to cache 44 via coherent point 38. Switch interface 34 may be any type of communication medium (e.g. a bus, a point-to-point interconnect, etc.) and may implement any protocol. An interface may refer to the signal definitions and electrical properties of the interface, and the protocol may be the logical definition of communications on the interface (e.g., including commands, ordering rules, coherence support). It is noted that memory controller caches 42 and 44 may also be referred to as system caches. In other embodiments, memory controller 40 may include other numbers of memory controller caches. For example, in another embodiment, memory controller 40 may include four separate memory controller caches.

Memory controller caches 42 and 44 may be configured to maintain a sticky status for each cache line stored in the caches. The sticky status may be implemented via a sticky state, sticky flag, sticky bit, sticky tag, or other similar field. In one embodiment, a tag memory may be utilized to store tag entries that correspond to cache lines stored in a data memory. The tag entries may include multiple fields including a sticky status field and a group ID field to identify the dataflow source of the request which caused the cache line to be allocated in the cache. In one embodiment, cache lines that are allocated as sticky may be retained until the cache receives a software command to clear the sticky allocation. Each cache 42 and 44 may be configured to implement a replacement policy for existing cache lines, but the replacement policy may exclude the sticky lines from being considered for replacement. A cache line may be allocated as sticky for a request that misses in the cache if the request includes a sticky allocation hint. A requesting agent may make the determination that a specific request should have a sticky allocation hint, and the requesting agent may base the determination on whether the data referenced by the specific request is likely to be used by subsequent requests.

Memory controller switch 46 may route traffic between memory controller caches 42 and 44 and memory channel units 48 and 50. There may be one memory channel unit 48 and 50 for each memory channel included in a given embodiment, and other embodiments may include one channel or more than two channels. The memory channel units 48 and 50 may be configured to schedule memory operations to be transmitted on the memory channel. The memory channel units 48 and 50 may be configured to queue read memory operations (or reads) and write memory operations (or writes) separately, and may be configured to arbitrate between reads and writes using a credit based system, for example. In the credit-based system, reads and writes may be allocated a certain number of credits.

In an embodiment, the memory channel units 48 and 50 may schedule memory operations in bursts of operations. To create bursts of memory operations for scheduling, the memory channel units 48 and 50 may group memory operations into affinity groups. A memory operation may be said to exhibit affinity with another memory operation if the operations may be performed efficiently on the memory interface when performed in close proximity in time.

It should be understood that the distribution of functionality illustrated in FIG. 2 is not the only possible architecture which may be utilized for an integrated circuit. Other integrated circuits may include other components, omit one or more of the components shown, and/or include a different arrangement of functionality among the components.

Figure 3:
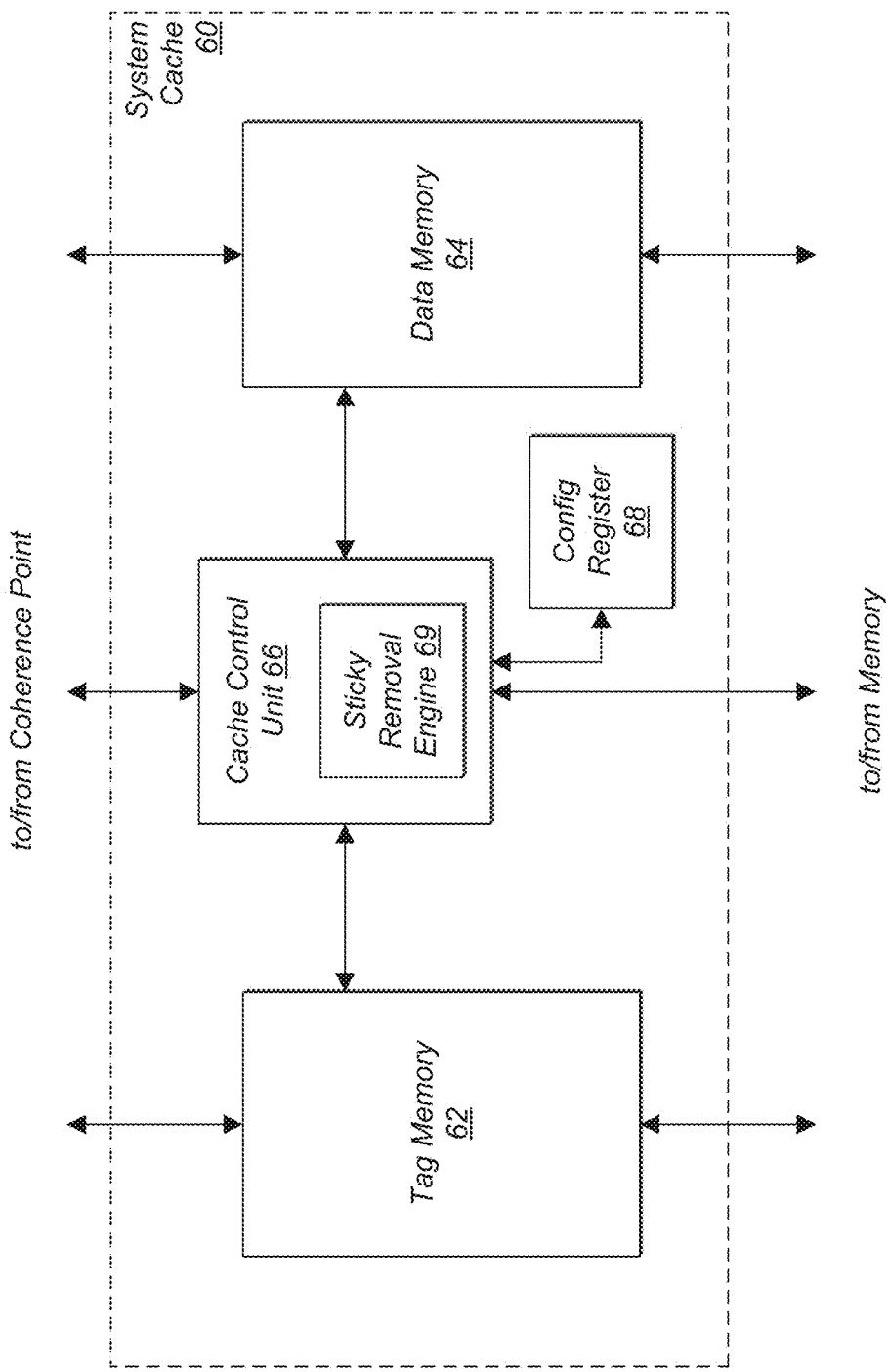
FIG. 3 is a block diagram illustrating one embodiment of a system cache.

Referring now to FIG. 3, a block diagram of one embodiment of a system cache is shown. In one embodiment, system cache 60 may include tag memory 62, data memory 64, cache control unit 66, and configuration register 68. It is noted that system cache 60 may also include other components and logic not shown in FIG. 3. For example, in other embodiments, system cache 60 may include arbitration circuitry to arbitrate among requests. It is to be understood that the system cache architecture shown in FIG. 3 is merely one possible architecture that may be implemented. In other embodiments, other system cache architectures may be utilized with the methods and mechanisms disclosed herein.

In one embodiment, tag memory 62 may be coupled to receive addresses for memory requests from requesting agents. It is noted that the terms "memory request" and "transaction" may be used interchangeably throughout this disclosure. Data memory 64 may be coupled to receive data or provide data for transactions. In various embodiments, tag memory 62 and data memory 64 may include multiple ways, and each way may be addressable by index. For example, in one embodiment, tag memory 62 and data memory 64 may each include 16 ways. In other embodiments, tag memory 62 and data memory 64 may include other numbers of ways.

Cache control unit 66 is coupled to tag memory 62 and data memory 64, and cache control unit 66 may be configured to receive various control data related to the received transactions and to respond to the received control data. Cache control unit 66 may include sticky removal engine 69, and sticky removal engine 69 may be configured to walk through all tag indexes in tag memory 62 and remove the sticky states for a given group ID when the software releases the sticky state for the given group ID. In various embodiments, sticky removal engine 69 may be hardware, software, or any combination thereof. It is noted that although cache control unit 66 is shown in FIG. 3 as a single unit, in other embodiments, cache control unit 66 may be split up into multiple units within system cache 60. Configuration register 68 may include configuration information for the various group IDs associated with the data stored in system cache 60. Configuration register 68 may be programmed by software commands sent to cache control unit 66 from the OS and/or various requesting agents.

Configuration register 68 is representative of any number of configuration registers which may be utilized as part of system cache 60. For example, in one embodiment, there may be a separate configuration register 68 for each group identifier (ID) assigned by the OS to use system cache 60. In this embodiment, each configuration register may define a status, quota, and clearance policy for a respective group ID. The status may be set to either active or inactive by a software command sent to system cache 60. When the status is set to inactive, this may trigger the cache control unit 66 to invalidate all of the lines that are allocated for this particular group ID. The quota may be set to limit the amount of lines that may be allocated for the respective group ID in system cache 60. In one embodiment, there may be a quota counter (not shown) for each group ID in the cache control unit 66. The quota counter may keep track of the number of cache lines in system cache 60 for the corresponding group ID. The replacement policy may specify if the given group ID can replace its own sticky lines with new sticky lines. In one embodiment, this replacement policy may be indicated using a sticky replacement configuration option indicator. This replacement policy may only be carried out if there are no available non-sticky cache line storage locations in system cache 60 for the new sticky line.

Data memory 64 may comprise a set of data entries, each having capacity to store a cache line of data. The cache line may be the unit of allocation and deallocation in data memory 64. The cache line may be any desirable size, such as 32 bytes or 64 bytes, although larger and smaller cache line sizes may be supported in other embodiments. In another embodiment, the cache lines of data memory 64 may be referred to as "cache blocks".

In various embodiments, data memory 64 may utilize any type of memory device. In one embodiment, data memory 64 may comprise a RAM, for example, indexed by entry number. Data memory 64 may be arranged so that a set of cache line storage locations may be selected for read/write operation responsive to an index portion of the input address (e.g., a number of bits of the address that may be decoded to uniquely select a set among the number of implemented sets). The cache line storage location that is to be accessed may be identified by the cache control unit 66 (e.g., responsive to detecting a cache hit for a request, responsive to allocating the cache line storage location to store a missing cache line). Data may be read from the accessed cache line storage location to return to the requestor for a read cache hit, or to transmit to the memory for a cache line evicted from system cache 60. Data may be written to the accessed cache line storage location for a write cache hit from a requestor or to complete a cache fill of a missing cache line into an allocated cache line storage location. In some embodiments, data memory 64 may be a banked implementation and bank selection control may be provided from the cache control unit 66 as well.

Tag memory 62 may utilize any type of memory device, such as for instance, a RAM. Alternatively, tag memory 62 may comprise a content addressable memory (CAM) for snooping purposes, or a RAM/CAM combination. The tag memory 62 may comprise a plurality of tag entries, each entry selected by a different value of the index mentioned above.

The selected tag entry may store the tags that correspond to the set of cache line storage locations in system cache 60 that are selected by the index. Each tag corresponds to a cache line in the respective cache line storage location, and may include the tag portion of the address of the corresponding cache line (i.e., the address, less the least significant bits that define an offset within the cache line and the bits that are used for the index), and various other state information. In response to a request, the tag memory 62 may be configured to decode the index and output the tags to the cache control unit 66 for processing. In an embodiment, the tag memory 62 may also include tag comparison circuitry configured to compare the tags to the tag portion of the request address, and may provide the comparison results to the cache control unit 66. In another embodiment, the cache control unit 66 may compare the tags. The cache control unit 66 may also be configured to perform various tag updates by writing the tag entry.

System cache 60 may have any configuration. In some embodiments, a direct mapped or set associative configuration may be implemented. In typical direct mapped and set associative caches, there is a preconfigured, one-to-one correspondence between tag entries and data entries. In a direct mapped configuration, each address maps to one possible entry (tag memory 62 and data memory 64) in system cache 60, at which the corresponding cache line would be stored. In one embodiment, system cache 60 may be associative, in which a given address maps to two or more cache line storage locations in the data memory 64 that may be eligible to store the cache line. System cache 60 may be set associative, in which each address maps to two or more possible entries (dependent on the associativity of the cache). In one embodiment, N cache line storage locations are mapped to addresses having the same value in a subset of the address bits referred to as an index, where N is an integer greater than one and less than the total number of cache line storage locations in data memory 64. The N cache line storage locations forming a set corresponding to a given index are often referred to as "ways". Other embodiments may be fully associative, in which any cache line storage location may be mapped to any address.

Cache control unit 66 may dynamically allocate a data entry in data memory 64 to store data for a transaction received by system cache 60. The transaction may be a write to memory, for example. The transaction may also be a read completion (with data) provided from the memory (not shown) in response to a read previously received from a requesting agent and targeting the memory.

In one embodiment, each transaction received by system cache 60 from a requesting agent may include a group ID number, a cache allocation hint, and one or more other attributes. The cache allocation hint may be utilized by system cache 60 and cache control unit 66 to determine how to allocate a cache line for the transaction if the transaction misses in the system cache 60. If a new cache line is allocated for the transaction, the group ID number may be stored in a corresponding entry in tag memory 62.

In one embodiment, cache control unit 66 may determine if there is an available entry in data memory 64 in response to receiving a sticky transaction from a requesting agent. If the transaction is sticky and a cache miss, and there is an available non-sticky entry in data memory 64, then a new sticky entry may be allocated for the transaction, replacing the available non-sticky entry. If the transaction is sticky and a cache hit to a non-sticky entry, the non-sticky entry may not be converted to sticky by this hit. In another scenario, if a non-sticky transaction hits on a sticky entry, then the sticky entry may remain sticky.

Tag memory 62 may be configured to store various tags for the cache lines cached in the system cache 60. For example, in one embodiment, the tags may include the coherence state, the sticky state, a dirty indicator, least recently used (LRU) data, a group identification (ID), and other data. Depending on the embodiment, some or all of these tags may be included in each entry of tag memory 62.

In one embodiment, a cache line may be initially allocated for a non-sticky transaction by a particular requesting agent. The particular requesting agent for which the cache line was initially allocated may be considered the primary user of that line. Any subsequent hits by other group IDs to this entry may be considered secondary users, and therefore, the original non-sticky state may be maintained for the cache line, even if subsequent hits for the cache line are for sticky transactions.

In one embodiment, a cache line with a sticky state allocated for a first group ID may be hit by a sticky transaction for a second group ID. In this scenario, the group ID of the tag entry corresponding to the cache line may be changed to the second group ID. In other words, the second group ID may inherit the cache line from the first group ID. This mechanism for inheriting cache lines may be useful in certain graphics processing applications, when data for a previous frame may be used again for the next frame. To facilitate the reuse of this data, the ownership of the cache line may be transferred from the first group ID to the second group ID.

In some embodiments, ownership of cache lines may be transferred from a first group ID to a second group ID via a software command sent to cache control unit 66. The software command may specify that all cache lines that are assigned to the first group ID be transferred to the second group ID. This feature may prove beneficial in many applications, including graphics applications.

Figure 4:
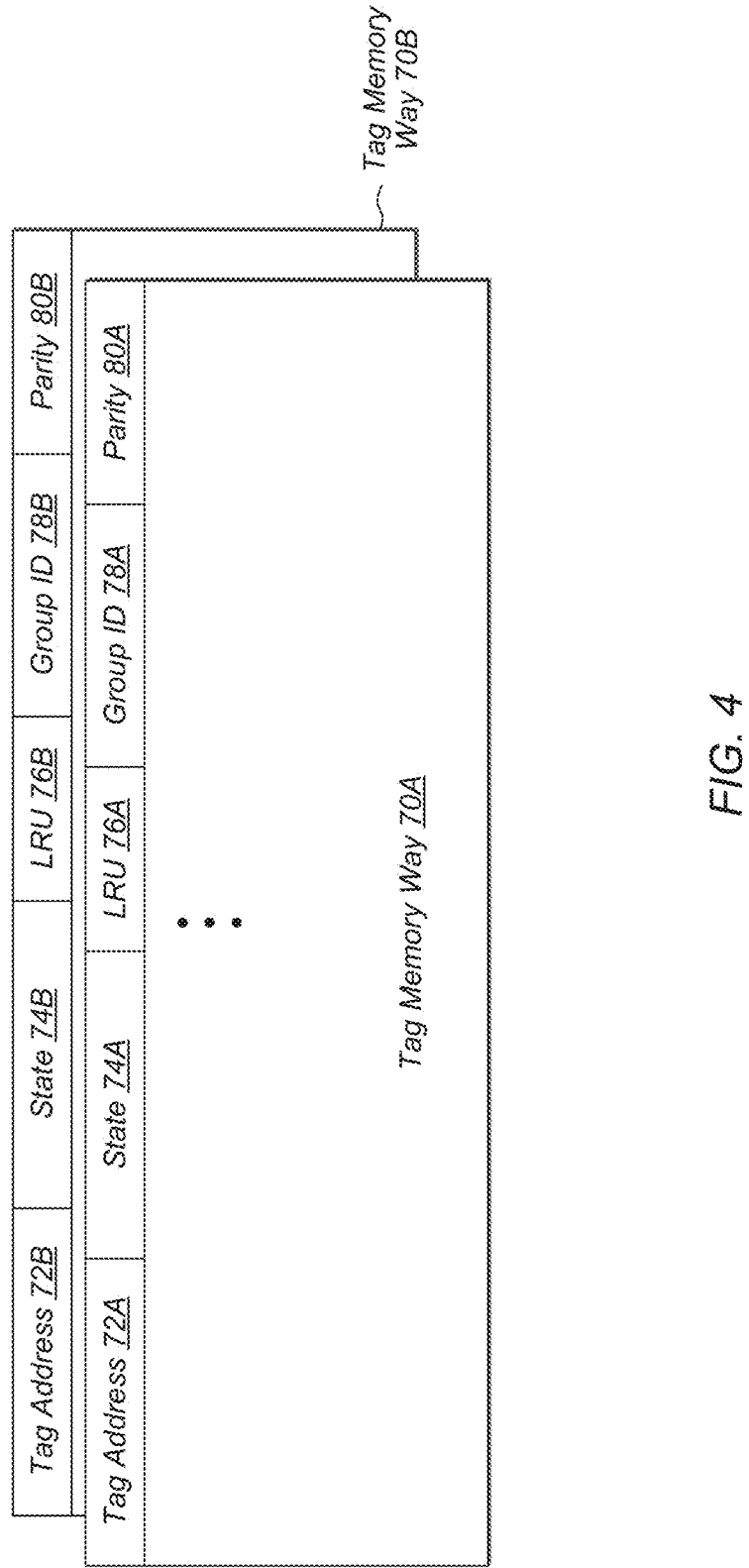
FIG. 4 is a block diagram illustrating one embodiment of a pair of tag memory ways.

Turning now to FIG. 4, a block diagram of one embodiment of a pair of tag memory ways is shown. Tag memory ways 70A-B are representative of any number of ways that may be included within a tag memory, such as tag memory 62 (of FIG. 3). In one embodiment, each tag memory way 70A-B may include any number of entries for data corresponding to cache lines stored in a corresponding data memory way. A sample entry is shown in each of tag memory ways 70A-B.

Each tag entry may include the tag portion of the address (tag address 72A-B), to be compared against input request addresses. Tag address 72A-B may include the most significant bits of the physical address field for a received transaction. The number of bits used for the tag address 72 field may vary depending on the embodiment. State 74A-B may represent the state of the corresponding cache line stored in the data memory. There may be multiple different values which the state 74A-B may take, depending on the embodiment. For example, in one embodiment, the different possible states may include the following: invalid, clean, dirty, data pending, sticky clean, sticky dirty, and LRU dirty. The clean/dirty status of a cache line may be conveyed along with the transaction to the system cache by the requesting agent. The requesting agent may also provide a hint as to the sticky status of the transaction. The data pending state may indicate that data for the cache line is currently being fetched from memory. Any entries with an invalid state may be chosen as the best candidates for replacement when a new line is allocated in the system cache. The next best candidates for replacement may be any entries with the LRU dirty state. It is noted that in another embodiment, each entry in tag memory ways 70A-B may include a sticky flag or sticky bit, and this may indicate if the entry is sticky, rather than the state field.

The requesting agent responsible for generating the transaction may convey a hint with the transaction that determines the state that will be assigned to the corresponding tag entry. This hint may determine if the data associated with the transaction is stored in the system cache. For example, in one scenario, for a specific transaction, the hint accompanying the transaction may indicate that the transaction is sticky. If the transaction is accompanied by a sticky hint, and the transaction misses in the system cache, then the data may be retrieved from memory and allocated in the system cache with a tag state 74 set to sticky. Setting the state to sticky indicates that this data will "stick" in the cache and will not be removed by the system cache. If data for another sticky transaction from a different group ID were attempting to allocate space in the system cache, this data would be prevented from replacing sticky lines from other group IDs.

In one embodiment, the only way to remove sticky data is for the system cache to receive a software command indicating that certain sticky data for a specific group ID may be removed. In another embodiment, sticky data for a first group ID may be removed from the system cache by other sticky data from the first group ID based on the settings of a corresponding configuration register. If the setting in the configuration register for a specific group ID indicates that this group ID may replace sticky lines with other sticky lines, then a sticky line may be replaced by another sticky line for this group ID. This setting may be referred to as the sticky configuration option.

In some embodiments, ownership of sticky lines may be transferred from one group ID to another group ID. This transfer of ownership may be utilized in various scenarios in which data may be initially used by a first group ID and then later by a second group ID. For example, in a graphics application, certain data may be used to build one frame. A first agent using a first group ID may initially allocate data for this graphics frame. Then, a second agent using a second group ID may reuse the data for the next frame of the graphics application. The software may generate a request to transfer ownership of the frame data from the first group ID to the second group ID. The system cache may receive this software request and as a result may pass ownership from the first group to the second group while keeping the data as sticky. Also, textures that are used in a current phase of a three-dimensional (3D) graphics application may be reused for the next phase. There may be an overlap between the 3D phases, like certain boundary tiles, and these tiles may be transferred between group IDs for consecutive phases. It is noted that the transfer of ownership of cache lines between group IDs may also occur in a variety of other applications besides just graphics applications.

Allocating a line in the system cache with a sticky state will result in the line being retained in the system cache even if the amount of time in between accesses to the sticky line is large. For example, certain data may be accessed frequently, but there may be a long duration of time between accesses. This data may be placed in the system cache with the state 74 set to sticky. Therefore, the data will remain in the system cache regardless of how long the duration of time is between accesses. For example, a first cache line may be allocated as sticky in the system cache, and a length of time may elapse such that all other lines in the cache may either be replaced or accessed at least once prior to the first cache line being accessed again. If a new line needs to be allocated in the cache, the new line will take the place of one of the non-sticky lines in the cache, even if the non-sticky line has been accessed more recently than the first cache line. The first cache line may remain in the cache even if it is the least recently accessed line in the cache. This is in contrast with a traditional cache, where most recently accessed lines are retained in the cache, and the lines that have not been accessed for a long period of time are replaced.

The LRU 76A-B field may store a value indicating a usage status associated with the corresponding line. This LRU 76A-B field may indicate how recently and/or how often the corresponding line has been accessed, and the number of bits in this field may vary depending on the embodiment. The Group ID 78A-B field may store a group ID identifying the group that owns the corresponding line in the data memory of the system cache. The group may refer to a specific dataflow that is being used by one or more requesting agents. It is noted that a "group ID" may also be referred to as a "dataset ID" in some embodiments. Depending on the embodiment, various numbers of bits may be utilized to represent the group ID. The group ID 78A-B field may be populated with the group ID associated with the corresponding cache line.

In some cases, a single group ID may be shared by two or more requesting agents. For example, page translation tables may be utilized by multiple requesting agents, and any transactions referencing the page translation tables may be assigned a common group ID. This common group ID may span multiple requesting agents. Also, each requesting agent may use multiple separate group IDs for the different dataflows being utilized by the requesting agent. A group ID may be assigned to a dataflow for one or more requesting agents by the OS of the host electronic device. In one embodiment, a device driver may request a group ID from the OS. As part of the request, the device driver may identify which type of data the request corresponds to. Then, in response to receiving the request from the device driver, the OS may specify the group ID to be used for this request based on the type of data being accessed.

Each group represented by a group ID may be assigned a specific quota of cache lines in the system cache. When a group reaches the total amount of its quota, the group may not be able to allocate any more lines in the system cache. Instead, the specific group may replace its existing lines in the cache with the newly allocated lines. In one embodiment, the first lines that are replaced for a given group ID may be the lines which have an invalid state followed by the lines which have a LRU dirty state.

The parity 80A-B field may include any number of parity bits to provide an indication of the accuracy of the data in the entire entry across all of the fields. It is noted that in other embodiments, each entry of tag memory ways 70A-B may include one or more additional fields of information not shown in FIG. 4. For example, information about how recently the cache line was replaced may also be stored in each tag of tag memory ways 70A-B. Also, in other embodiments, tag memory ways 70A-B may be structured in any other suitable manner.

Figure 5:
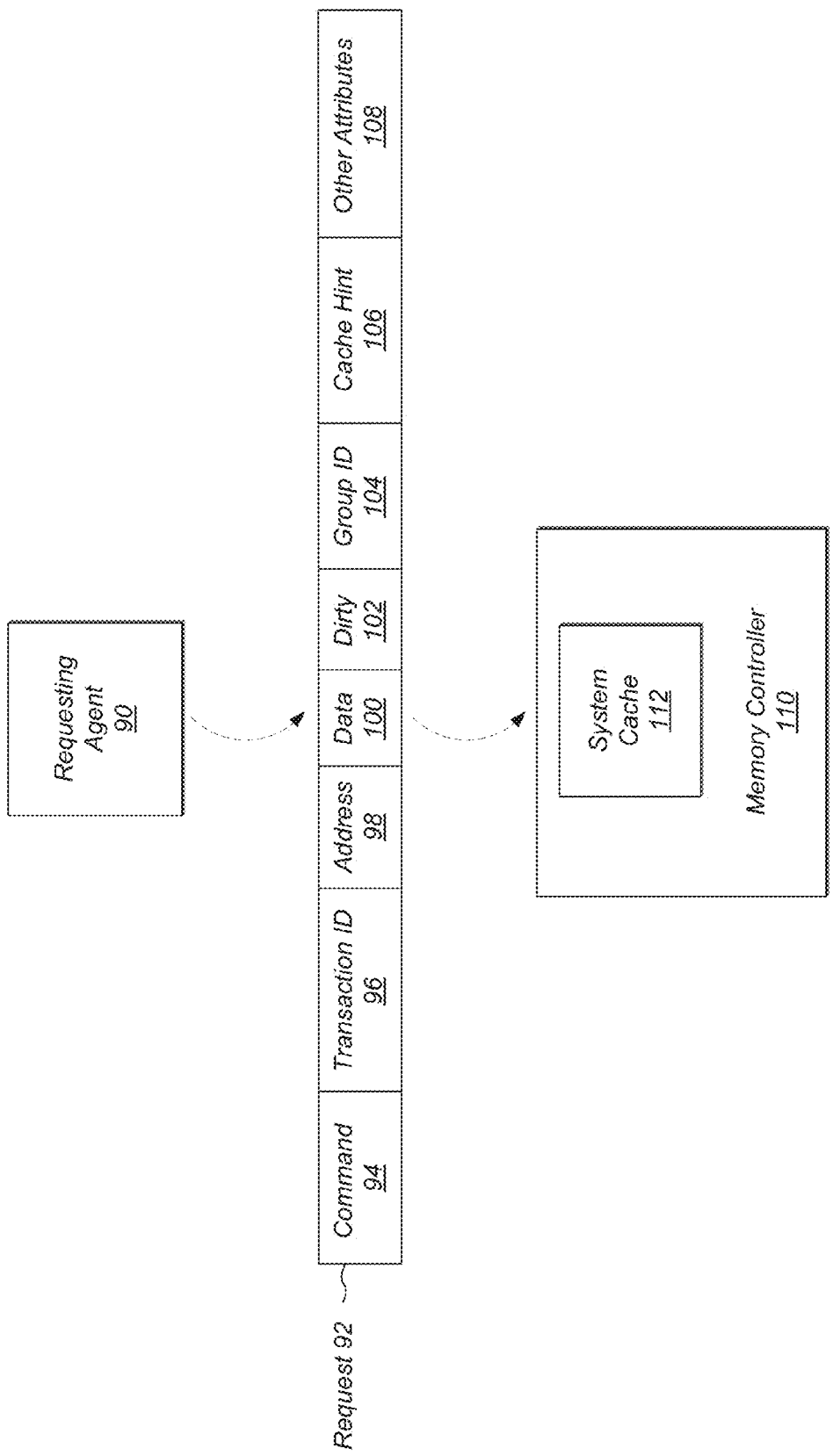
FIG. 5 illustrates one embodiment of a requesting agent conveying a request to a system cache.

Referring now to FIG. 5, one embodiment of a requesting agent conveying a request to a system cache is shown. Requesting agent 90 is representative of any number and type of requesting agents. Although requesting agent 90 is shown as sending request 92 directly to memory controller 110, it is noted that one or more components (e.g., coherent point, switch) may be located between requesting agent 90 and memory controller 110.

Each request sent from requesting agent 90 may include a plurality of fields. For example, in one embodiment, request 92 may include command 94, which indicates the type of request (e.g., read, write) being sent. Request 92 may also include transaction ID 96, which indicates the transaction ID associated with request 92. Transaction ID 96 may uniquely identify the request for requesting agent 90. It is noted that transaction ID 96 may also be referred to as a "request ID". In addition, in other embodiments, request 92 may also include an agent ID to identify the requesting agent. Request 92 may also include the address 98 and data 100 fields to identify the memory address and data (for a write request), respectively.

Request 92 may also include a dirty status indicator 102 to indicate if the write data is dirty. Request 92 may also include a group ID 104 to identify the group ID of request 92. Allocation hint 106 may determine how request 92 is treated by system cache 112. In other embodiments, allocation hint 106 may be referred to as a "sticky hint", "sticky flag", "sticky bit", or "sticky attribute". Other attributes 108 are representative of any number and type of additional attributes (e.g., coherency, QoS, size of the request, requestor ID) which may be part of request 92.

Although system cache 112 is shown as a single unit, it should be understood that in other embodiments, system cache 112 may be split up into two or more separate units. For example, memory controller 110 may include two channels and system cache 112 may be split up into two separate physical system caches managed as one logical system cache.

Figure 6:
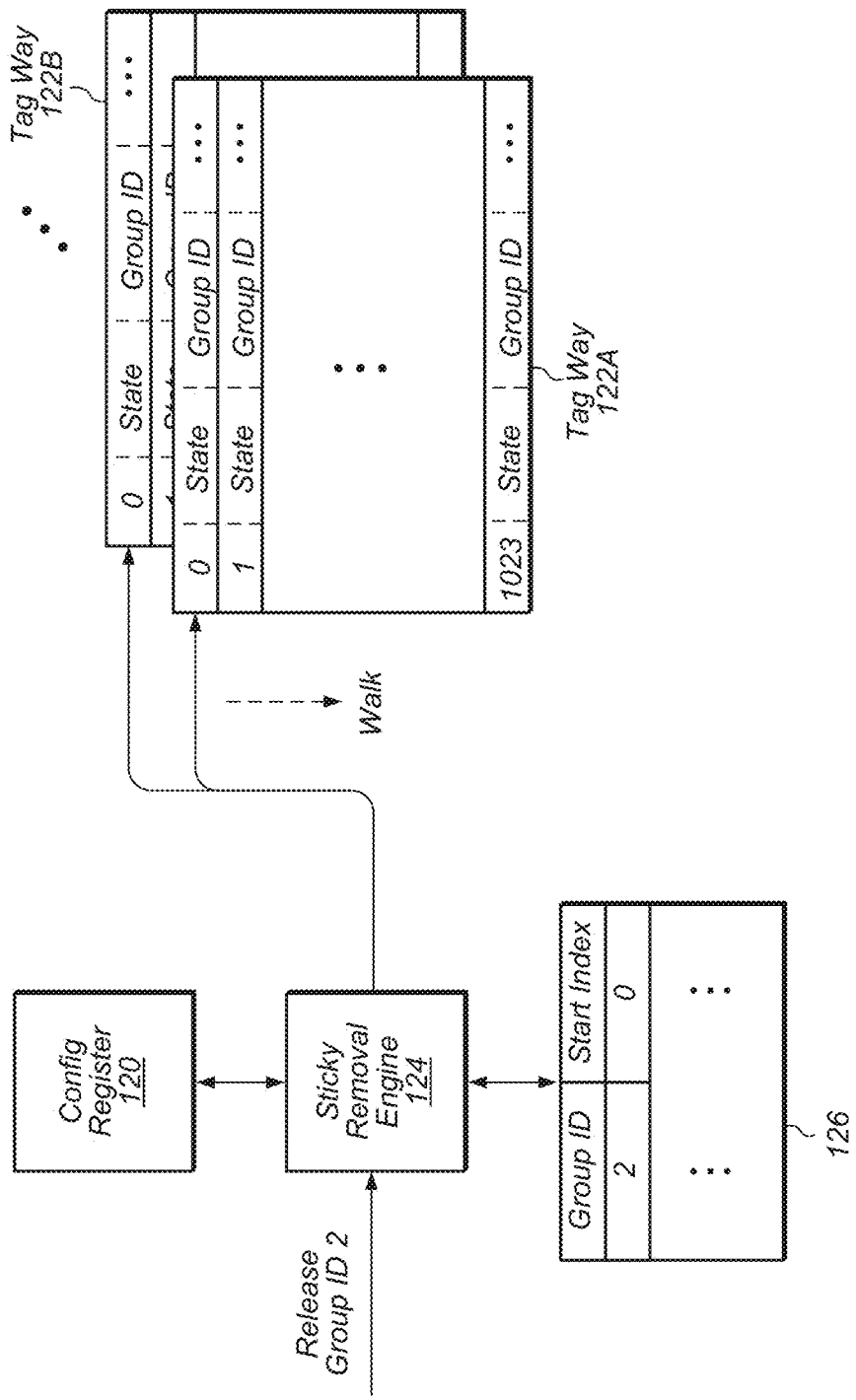
FIG. 6 is a block diagram of one embodiment of a sticky removal engine within a system cache.

Turning now to FIG. 6, a block diagram of one embodiment of a sticky removal engine within a system cache is shown. In one embodiment, sticky removal engine 124 may be configured to walk through the indexes of a tag memory to clear the sticky state of corresponding cache lines belonging to group ID's that are being released. Tag ways 122A-B are shown in FIG. 6, and tag ways 122A-B are representative of any number of ways of a tag memory. Each entry of tag ways 122A-B may include an index, state field, group ID field, and one or more other fields not shown in FIG. 6 to avoid cluttering the figure.

In one embodiment, sticky removal engine 124 may receive a software command to release the cache lines belonging to group ID 2. Engine 124 may log the start index 0 in table 126 for group ID 2. It will be assumed for the purposes of this discussion that engine 124 was idle prior to receiving the release request for group ID 2, and therefore, engine 124 may start at index 0 when walking through the tag memory.

At each index, engine 124 may look for a group ID match in each way 122A-B at that particular index. For example, in another embodiment, the tag memory may include 16 ways, and at each step through the tag memory indexes, engine 124 may compare the group ID field of all 16 ways to the group ID being cleared. If engine 124 finds a match, then the state field of the entry may be changed to LRU dirty. In another embodiment, if engine 124 finds a match, the state field may be changed to another state that specifies the corresponding cache line is a primary candidate for replacement. For example, in one embodiment, if the state field is dirty (sticky or non-sticky) it may be changed to LRU dirty and if the state field is clean (sticky or non-sticky) it may be changed to invalid. Other suitable techniques for indicating that the corresponding cache line should be replaced are possible and are contemplated. It is noted that engine 124 may change multiple entries in multiple ways at a single index if multiple matches are found. Engine 124 may continue walking through the indexes until it returns to the starting index indicated in table 126.

When the engine 124 clears the state field of a particular entry, the corresponding cache line of that particular entry may not be removed from the system cache immediately. Rather, the cache line may be replaced at some future point in time when a request misses in the system cache and a new cache line is being allocated for this request. This allows the clearing process to finish quickly by reducing the amount of traffic generated during the clearing process. In some embodiments, the tag pipeline may only be able to generate a single transaction per clock cycle. If the clearing process were configured to immediately flush matching cache lines, this could delay the clearing process. For example, if matches were found with multiple entries at a single index, multiple dirty cache lines would need to be flushed back to memory. In this case, the clearing process would be delayed waiting for dirty lines to be flushed. Therefore, to avoid these types of delays, the clearing process may mark cache lines as primary candidates for replacement and then move on to the next index of the tag memory. When the cache control unit is searching for a replacement candidate at some later point in time, the cache control unit may prefer to replace one of these cache lines marked as a primary candidate for replacement.

In one embodiment, a quota clearing method may be specified in the system cache's configuration register 120. Sticky removal engine 124 may determine the quota clearing method by querying register 120. If the quota clearing method is set to flush, dirty cache lines may be written to memory when clearing a given group ID from the system cache. If the quota clearing method is set to drop, then dirty cache lines may not be written back to memory and instead may be invalidated.

Configuration register 120 may also include a quota enable indicator per group ID. In one embodiment, to initiate the clearance process for a given group ID, a software agent may send a command to clear the quota enable indicator for the given group ID. The system cache may detect the transition on the quota enable indicator, and then the system cache may launch sticky removal engine 124. The sticky removal engine may then clear all cache lines allocated for the given group ID based on the quota clearing method specified in configuration register 120. If the quota clearing method is set to flush, then the dirty lines for the given group ID may be set to LRU dirty and written back to memory later. If the quota clearing method is set to drop, then the dirty lines for the given group ID may be invalidated. After all lines for the given group ID have been cleared, then a quota state indicator bit for the given group ID in configuration register 120 may be cleared to 0. If a software agent sets the quota enable indicator while the clearing is still being implemented, then requests with that group ID may not allocate in the system cache until the clearing is complete.

Figure 7:
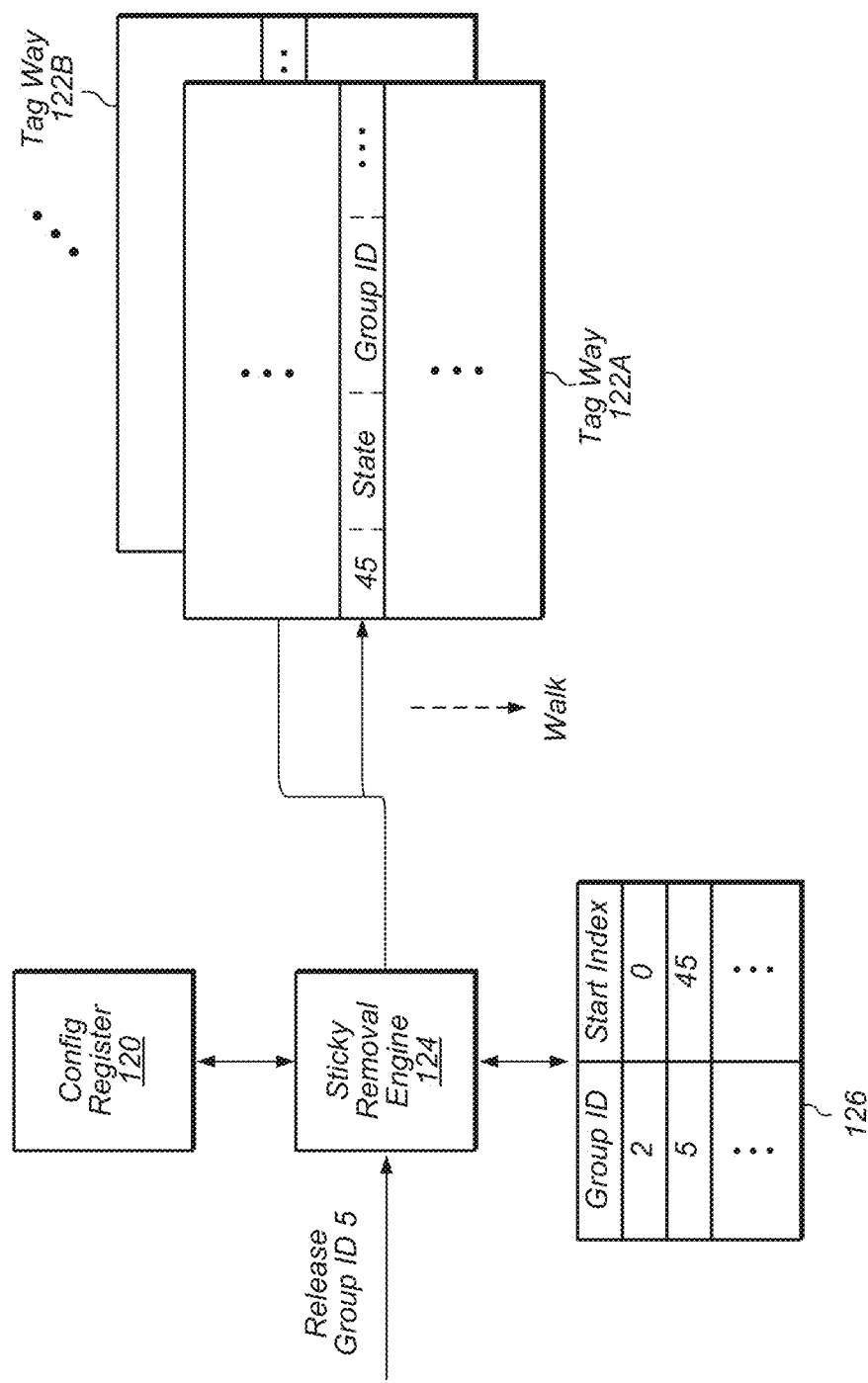
FIG. 7 is a block diagram of another embodiment of a sticky removal engine.

Referring now to FIG. 7, a block diagram of another embodiment of a sticky removal engine is shown. The example shown in FIG. 7 is a continuation of the index walk of sticky removal engine 124 shown in FIG. 6. Sticky removal engine 124 may have reached index 45 as shown in the entry in tag way 122A. Engine 124 may have walked through index 0 to index 45 searching for matches with group ID 2 based on the received release request for group ID 2 as shown in FIG. 6. The starting index of 0 may be recorded in table 126 for group ID 2.

As shown in FIG. 7, when sticky removal engine 124 reaches index 45 in the index walk for releasing group ID 2, engine 124 may receive a release request for group ID 5. In response, engine 124 may log its current location of index 45 in the start index field of table 126. Engine 124 may also query configuration register 120 to determine the specific type of clearance process to utilize for group ID 5. Then engine 124 may continue its walk through tag ways 122A-B, this time searching for matches with group ID 2 or 5.

When sticky removal engine 124 reaches the last index of the tag memory ways 122A-B, then sticky removal engine 124 may wrap around to the first index of ways 122A-B and continue the index walk from there. Engine 124 may stop clearing states of cache lines for group ID 2 at that point but may continue clearing states of cache lines for group ID 5 until returning to the starting index (45) logged in table 126. It is noted that engine 124 may receive any number of release requests while performing an index walk through tag ways 122A-B. Engine 124 may store the starting index in table 126 for each group ID for which a release request has been received. Engine 124 may be configured to perform any number of simultaneous clearance processes.

Figure 8:
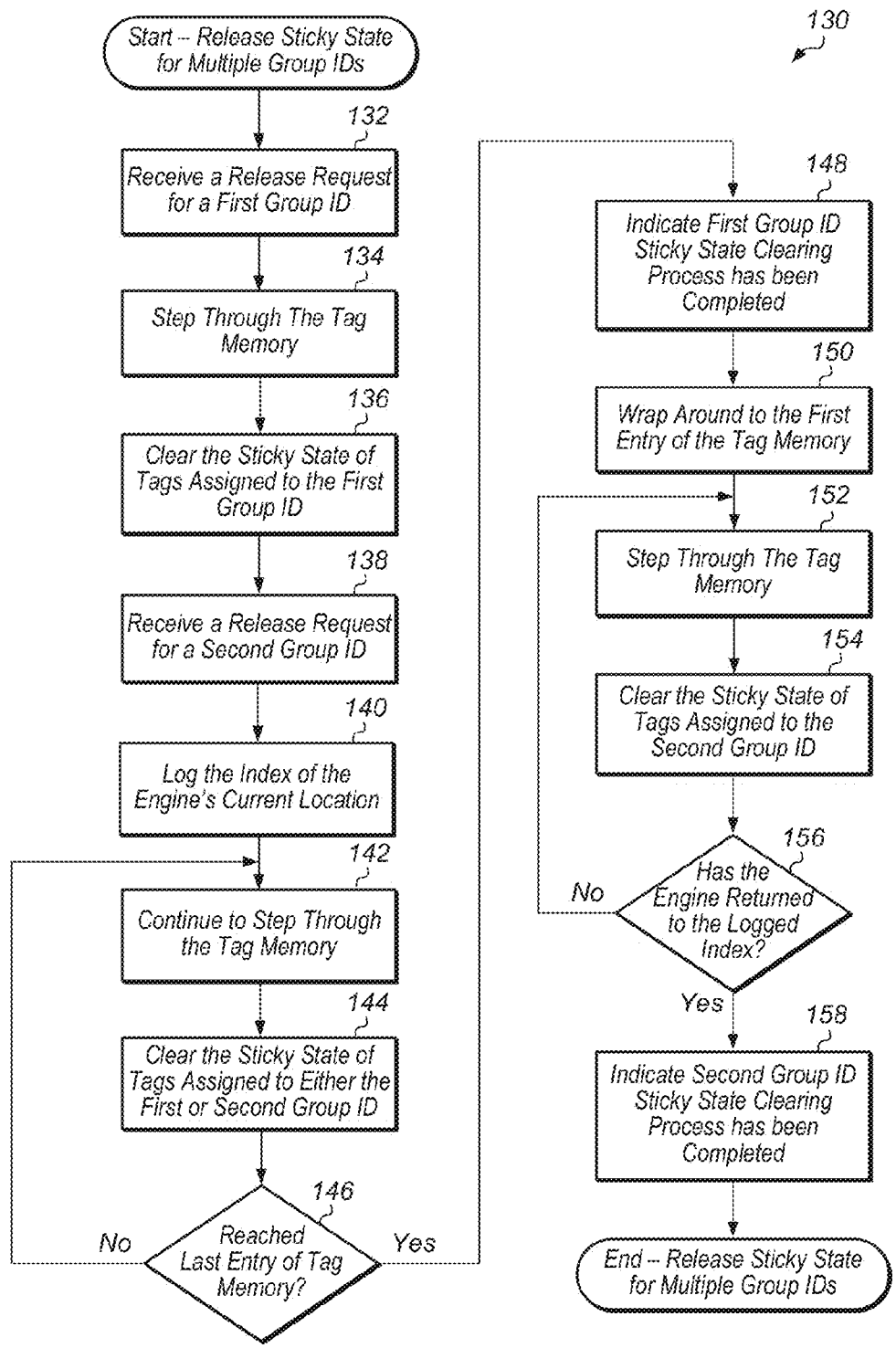
FIG. 8 is a generalized flow diagram illustrating one embodiment of a method for releasing the sticky state for multiple group IDs.

Turning now to FIG. 8, one embodiment of a method 130 for releasing the sticky state for multiple group IDs is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, a sticky removal engine may receive a request to release the sticky state for cache lines assigned to a first group ID (block 132). In response to receiving this request, the sticky removal engine may start to step through the tag memory, beginning at the first entry of the tag memory (block 134). In other embodiments, the sticky removal engine may begin its walk through the tag memory at some other entry. At each step, the engine may clear the sticky state of the tag if the tag is assigned to the first group ID (block 136). In one embodiment, the tag memory may have a multi-way set associative configuration. In this embodiment, the engine may read the group ID field of the tag in each way and clear the sticky state of any tag assigned to the first group ID. The engine may clear the sticky state of multiple entries in a single step if more than one tag at a single index is assigned to the first group ID.

During the walk through the tag memory to release the sticky state of the first group ID, the sticky removal engine may receive a second release request (block 138). The second release request may be for a second group ID to clear all of its cache lines from the system cache. In response to receiving the second release request for the second group ID, the engine may log the index of the engine's current location in the tag memory (block 140). In one embodiment, this index may be stored in a table and the index may be identified as being associated with the second group ID. Then, the engine may continue its walk through the tag memory, but now the engine may expand its search by looking for matches with either the first group ID or the second group ID (block 142). If the engine finds a match with either of the first or second group ID, the engine may clear the sticky state of the matching tag entry (block 144). In one embodiment, the engine may clear the sticky state of a matching tag entry by setting the state of the tag to LRU dirty.

If the engine has reached the last entry of the tag memory (conditional block 146, "yes" leg), then the engine may generate an indication that the sticky state clearing process has been completed for the first group ID (block 148). In one embodiment, the engine may signal the end of the sticky state clearing process by clearing a quota state indicator to inactive for the first group ID in the configuration register. If the engine has not reached the last entry of the tag memory (conditional block 146, "no" leg), then the engine may continue its walk through the tag memory looking for matches with either the first group ID or the second group ID (block 142).

After block 148, the engine may wrap around to the first entry of the tag memory (block 150). Then, the engine may continue to step through the entries of the tag memory, but at each entry, the engine may only look for matches with the second group ID (block 152). If the engine finds a match with the second group ID, the engine may clear the sticky state of the matching tag entry (block 154).

If the engine has returned to the index that was logged when receiving the second release request for the second group ID (conditional block 156, "yes" leg), then the engine may signal that the sticky state clearing process has been completed for the second group ID (block 158). If the engine has not returned to the logged index (conditional block 156, "no" leg), then the engine may continue its walk through the tag memory looking for matches with the second group ID (block 152). After block 158, method 130 may end.

It is noted that the sticky removal engine may perform a sticky clearing process simultaneously for more than two group IDs. The engine may utilize a method for three or more group IDs in a similar fashion to method 130. Each time the engine receives a release request for a group ID, the engine may log the index of the tag memory of the engine's current location. Then, the engine may wrap around in its walk through the tag memory until it returns to the logged index. The engine may log any number of indexes for any number of group IDs and may search for multiple separate group IDs at each step through the tag memory.

Figure 9:
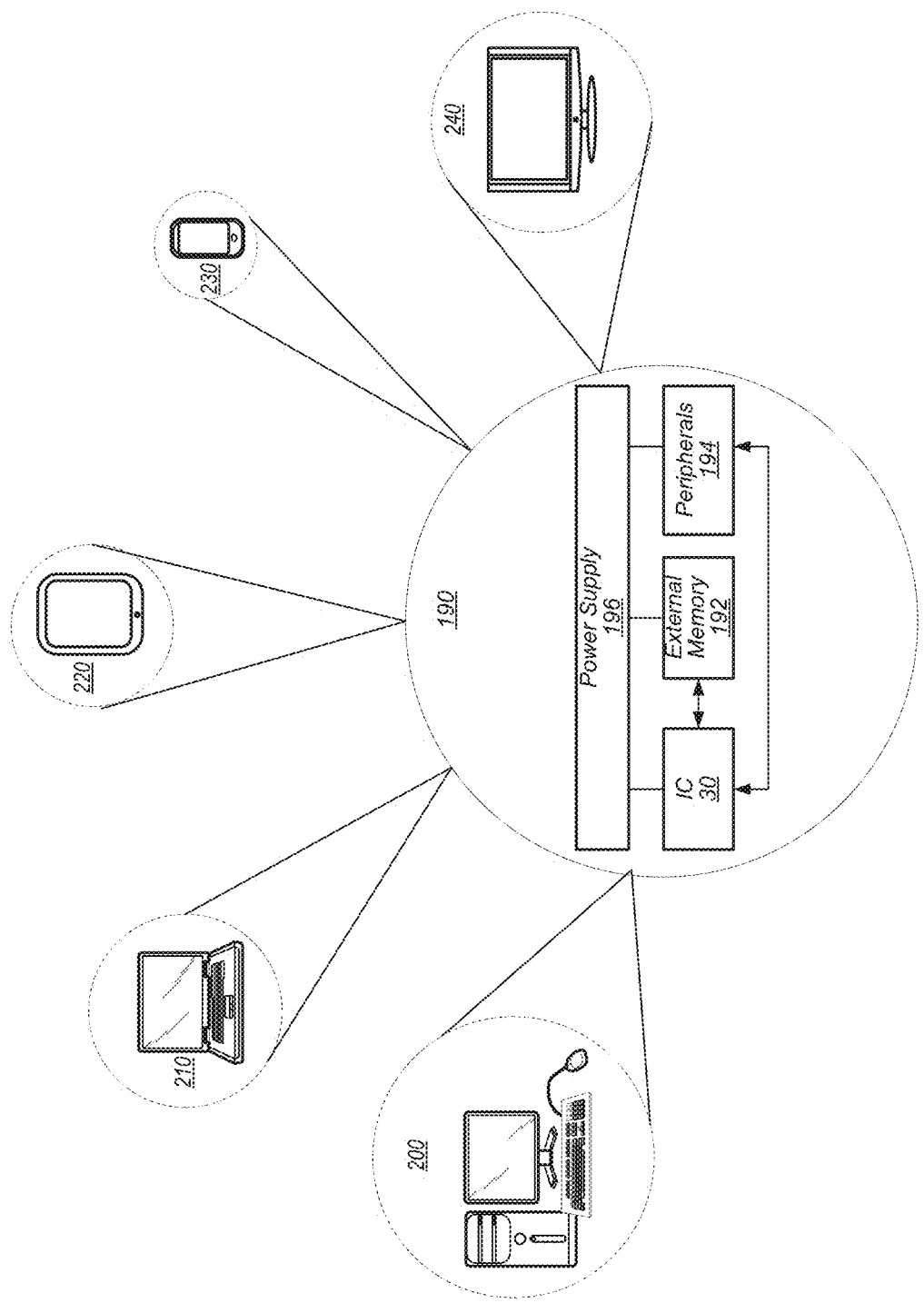
FIG. 9 is a block diagram of one embodiment of a system.

Referring next to FIG. 9, a block diagram of one embodiment of a system 190 is shown. As shown, system 190 may represent chip, circuitry, components, etc., of a desktop computer 200, laptop computer 210, tablet computer 220, cell phone 230, television 240 (or set top box configured to be coupled to a television), or otherwise. In the illustrated embodiment, the system 190 includes at least one instance of IC 30 (of FIG. 2) coupled to an external memory 192.

IC 30 is coupled to one or more peripherals 194 and the external memory 192. A power supply 196 is also provided which supplies the supply voltages to IC 30 as well as one or more supply voltages to the memory 192 and/or the peripherals 194. In various embodiments, power supply 196 may represent a battery (e.g., a rechargeable battery in a smart phone, laptop or tablet computer). In some embodiments, more than one instance of IC 30 may be included (and more than one external memory 192 may be included as well).

The memory 192 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 30 in a chip-on-chip configuration, a package-on-package configuration, or a multi-chip module configuration.

The peripherals 194 may include any desired circuitry, depending on the type of system 190. For example, in one embodiment, peripherals 194 may include devices for various types of wireless communication, such as wifi, Bluetooth, cellular, global positioning system, etc. The peripherals 194 may also include additional storage, including RAM storage, solid state storage, or disk storage. The peripherals 194 may include user interface devices such as a display screen, including touch display screens or multitouch display screens, keyboard or other input devices, microphones, speakers, etc.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A memory controller comprising a system cache, wherein the system cache comprises:
   a data memory configured to store a plurality of cache lines;
   a tag memory configured to store a plurality of tags corresponding to the plurality of cache lines, wherein each of the plurality of tags includes a state field and a group identifier (ID) field, wherein the group ID field identifies a dataflow associated with the cache line; and
   a sticky removal engine configured to successively access tags in the tag memory and modify states of tags associated with a first group ID that is releasing its cache lines.

2. The memory controller as recited in claim 1, wherein the sticky removal engine is further configured to log a first starting index for the first group ID prior to successively accessing tags in the tag memory, wherein the first starting index indicates a current location of the sticky removal engine.

3. The memory controller as recited in claim 2, wherein the sticky removal engine is further configured to successively access tags in the tag memory until returning to the first starting index.

4. The memory controller as recited in claim 3, wherein prior to returning to the first starting index, the sticky removal engine is configured to log a second starting index for a second group ID responsive to receiving a request to release cache lines for the second group ID.

5. The memory controller as recited in claim 4, wherein the sticky removal engine is further configured to modify states of tags associated with either the first group ID or the second group ID until returning to the first starting index.

6. The memory controller as recited in claim 5, wherein the sticky removal engine is further configured to modify states of tags associated with the second group ID responsive to reaching the first starting index and prior to returning to the second starting index.

7. The memory controller as recited in claim 1, wherein responsive to finding a given tag associated with the first group ID, the sticky removal engine is configured to modify the state of the given tag to indicate the given tag is a primary candidate for replacement.

8. A cache configured to:
   store a plurality of cache lines in a data memory;
   store a plurality of tags corresponding to the plurality of cache lines, wherein each of the plurality of tags includes a state and a group identifier (ID), wherein the group ID identifies a dataflow group of the request which caused the cache line to be stored in the cache;
   receive a first request to clear all cache lines for a first group ID;
   record a first starting index of a starting position within the plurality of tags responsive to receiving the first request;
   step through the plurality of tags to identify cache lines belonging to the first group ID; and
   clear a state of a given cache line responsive to determining the given cache line belongs to the first group ID.

9. The cache as recited in claim 8, wherein the cache is further configured to stop stepping through the plurality of tags upon returning to the first starting index.

10. The cache as recited in claim 9, wherein the cache is further configured to record a second starting index of a starting position within the plurality of tags responsive to receiving a second request to clear all cache lines for a second group ID, wherein the second request is received prior to returning to the first starting index.

11. The cache as recited in claim 10, wherein responsive to receiving the second request the cache is further configured to:
   step through the plurality of tags to identify cache lines belonging to either the first group ID or the second group ID; and
   clear the state of a given cache line responsive to determining the given cache line belongs to either the first group ID or the second group ID.

12. The cache as recited in claim 11, wherein subsequent to returning to the first starting index, the cache is further configured to step through the plurality of tags to identify cache lines belonging to the second group ID.

13. The cache as recited in claim 12, wherein the cache is further configured to stop stepping through the plurality of tags upon returning to the second starting index.

14. The cache as recited in claim 11, wherein the cache has an N-way set associative configuration, wherein N is an integer, and wherein the cache is configured to search all N ways at each tag index to identify any cache lines belonging to the first group ID.

15. The cache as recited in claim 8, wherein clearing the state of a given cache line comprises changing the state of the given cache line to least recently used (LRU) dirty.

16. The cache as recited in claim 8, wherein the cache is further configured to maintain a quota clearing method indicator per group ID set to flush or drop to specify if dirty cache lines for a corresponding group ID should be written back to memory or dropped, respectively.

17. The cache as recited in claim 16, wherein the cache is further configured to flush all cache lines corresponding to the first group ID, responsive to determining the quota clearing method indicator for the first group ID is set to flush.

18. The cache as recited in claim 16, wherein the control unit is further configured to invalidate all cache lines corresponding to the first group ID, responsive to determining the quota clearing method is set to drop.

19. A method comprising:
   receiving a first sticky release request at a system cache, wherein the first sticky release request is for a first group ID;
   recording a first starting index of a sticky removal engine for the first group ID;
   stepping through the plurality of tags searching for matches with the first group ID;
   prior to returning to the first starting index, receiving a second sticky release request at the system cache, wherein the second sticky release request is for a second group ID;
   recording a second starting index of the sticky removal engine for the second group ID; and
   stepping through the plurality of tags searching for matches with either the first group ID or the second group ID.

20. The method as recited in claim 19, further comprising clearing a state of a given tag responsive to finding a match at the given tag.

21. The method as recited in claim 20, further comprising stepping through the plurality of tags searching for matches with the second group ID responsive to returning to the first starting index.

22. The method as recited in claim 21, further comprising terminating the search for matches with the second group ID responsive to returning to the second starting index.

23. The method as recited in claim 20, wherein a given cache line corresponds to the given tag, wherein responsive to detecting a miss for a memory access request at the system cache, replacing the given cache line with a new cache line for the memory access request.

24. A method comprising:
- stepping through entries of a tag memory of a system cache responsive to detecting a request to release a first group ID's cache lines from the system cache;
- at each entry, determining if a group ID of the entry is assigned to the first group ID; and
- clear a sticky state of an entry responsive to determining the entry is assigned to the first group ID.

25. The method as recited in claim 24, further comprising:
- detecting a request to release a second group ID's cache lines from the system cache prior to stepping through all of the entries of the tag memory;
- logging an index of a most recent step through the entries of the tag memory responsive to detecting the request to release the second group ID's cache lines;
- at each entry, determining if a group ID of the entry is assigned to either the first group ID or the second group ID; and
- clear a sticky state of an entry responsive to determining the entry is assigned to either the first group ID or the second group ID.

26. The method as recited in claim 25, further comprising wrapping around to a start of the entries of the tag memory and continuing to step through the entries of the tag memory responsive to reaching a last entry of the tag memory.

27. The method as recited in claim 26, further comprising continuing to step through the entries of the tag memory until reaching the logged index.

* * * * *